(12) United States Patent
Vion-Dury et al.

(10) Patent No.: US 8,209,599 B2
(45) Date of Patent: Jun. 26, 2012

(54) METHOD AND SYSTEM FOR HANDLING REFERENCES IN MARKUP LANGUAGE DOCUMENTS

(75) Inventors: Jean-Yves Vion-Dury, Biviers (FR); Jean-Pierre Chanod, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 517 days.

(21) Appl. No.: 12/428,895

(22) Filed: Apr. 23, 2009

(65) Prior Publication Data

US 2010/0275117 A1    Oct. 28, 2010

(51) Int. Cl.
G06F 17/00    (2006.01)
(52) U.S. Cl. ......... 715/208; 715/206; 715/207; 715/234
(58) Field of Classification Search .................. 715/205, 715/208, 234
See application file for complete search history.

(56) References Cited

U.S. PATENT DOCUMENTS

| | | | |
|---|---|---|---|
| 7,171,481 B2* | 1/2007 | Hayashi et al. | 709/229 |
| 7,484,178 B2* | 1/2009 | Sholl | 715/760 |
| 7,756,049 B2* | 7/2010 | Chen et al. | 370/252 |
| 2003/0051216 A1* | 3/2003 | Hsu et al. | 715/530 |
| 2006/0156220 A1* | 7/2006 | Dreystadt et al. | 715/501.1 |
| 2006/0183085 A1* | 8/2006 | Amit et al. | 434/118 |
| 2008/0270345 A1* | 10/2008 | Barlow et al. | 707/2 |
| 2009/0105983 A1* | 4/2009 | Variyam et al. | 702/124 |
| 2010/0275117 A1* | 10/2010 | Vion-Dury et al. | 715/234 |

FOREIGN PATENT DOCUMENTS

| | | | |
|---|---|---|---|
| WO | WO0152078 | * | 7/2001 |
| WO | WO 0152078 A1 | * | 7/2001 |

OTHER PUBLICATIONS

W3.org, "Naming and Addresing", Mar. 12, 2007, pp. 1-3 http://web.archive.org/web/20070312184302/http://www.w3.org/Addressing/.*
Wen-Kui Chang et al., "A systematic framework for evaluating hyperlink validity in Web enviroment", Third International Conference on Quality Software, Nov. 2003, pp. 1-8.*
*Extensible Markup Language (XML) 1.0 (Second Edition)*, W3C Recommendation Oct. 6, 2000, http://www.w3.org/TR/2000/REC-xml-20001006.
*Extensible Markup Language (XML) 1.1*, W3C Recommendation, Feb. 4, 2004, edited in place Apr. 15, 2004, http://www.w3.org/TR/2004/REC-xml11-20040204/#sec-external-ent.
*How to write an XML catalog file*, Bob Stayton, in "*DocBook XSL: The Complete Guide*," Part 1, Chapter 5, http://www.sagehill.net/docbookxsl/WriteCatalog.html, copyright 2002-2007, downloaded Apr. 20, 2009.
*Internationalized Resource Identifiers*, Duerst and Suignard, Jan. 2005, http://www.ietf.org/rfc/rfc3987.txt.

(Continued)

Primary Examiner — Stephen Hong
Assistant Examiner — Mario M Velez-Lopez
(74) Attorney, Agent, or Firm — Fay Sharpe LLP

(57) ABSTRACT

A computer-based method and system for processing links in a markup language document are provided. The method includes providing a specification in computer memory, the specification including at least one link description rule and at least one link processing rule for processing links which satisfy the link description rule. A markup language document is input to computer memory and links in the markup language document are processed in accordance with the link description rule(s) and link processing rule(s) of the specification to generate processed data. The processed data includes at least one of a modified markup language document and data derived from the markup language document.

23 Claims, 8 Drawing Sheets

OTHER PUBLICATIONS

*MIME Media Types*, Internet Assigned Numbers Authority (IANA), http://www.iana.org/assignments/media-types/, updated Mar. 6, 2007.

*MIME-Type File Reference*, non normative list of mime media types and usual associated file name extensions, http://www.mimetype.org/, downloaded Apr. 20, 2009.

*RelaxNG*, Wikipedia, http://en.wikipedia.org/wiki/RELAX_NG, last modified Apr. 6, 2009.

*Saxonica XSLT and XQuery processing*, Michael Kay, http://www.saxonica.com/ downloaded Apr. 20, 2009.

*Uniform Resource Identifier (URI): Generic Syntax*, IETF—RFC 3986, T. Berners-Lee, et al., Jan. 2005, http://www.ietf.org/rfc/rfc3986.txt.

*XML Base (Second Edition)*, W3C Recommendation, Jan. 28, 2009, http://www.w3.org/TR/xmlbase/.

*XML Catalogs*, OASIS Committee Specification Aug. 6, 2001, http://www.oasis-open.org/committees/entity/spec-2001-08-06.html.

*XML Inclusions (XInclude)*, W3C Recommendation Nov. 15, 2006, http://www.w3.org/TR/xinclude/.

*XML Linking Language (XLink)*, W3C Recommendation Jun. 27, 2001, http://www.w3.org/TR/xlink/.

*XML Namespace*, Wikipedia, http://en.wikipedia.org/wiki/XML_namespace, last modified Mar. 28, 2009.

*XML Path Language (XPath)*, W3C Recommendation Nov. 16, 1999, http://www.w3.org/TR/xpath.

*XPointer Framework*, W3C Recommendation, Mar. 25, 2003, http://www.w3.org/TR/xptr-framework/.

*XPointer xpointer( ) Scheme*, W3C Working Draft, Dec. 19, 2002, http://www.w3.org/TR/xptr-xpointer/.

\* cited by examiner

```xml
<group tag="references">
  <iri locator="//a/@href"/>
  <group locator="//object">
    <iri locator="/@classid"/>
    <iri tag="code-locator" locator="/@codebase"/>
    <iri locator="/@data"/>
    <iri locator="/@archive" list="yes"/>
    <iri locator="/@usemap"/>
  </group>
  <iri tag="code-locator" locator="//applet/@codebase"/>
</group>

<group locator="//img">
  <iri tag="image-locator" locator="/@src"/>
  <iri tag="descriptor" locator="/@longdesc"/>
  <iri locator="/@usemap"/>
</group>

<iri locator="//area/@href"/>
<iri locator="//form/@action"/>
<iri locator="//input/@src"/>
<iri locator="//input/@usemap"/>

</links>
```

FIG. 3B

METHOD AND SYSTEM FOR HANDLING REFERENCES IN MARKUP LANGUAGE DOCUMENTS

BACKGROUND

The exemplary embodiment relates to processing links (references) in a markup language document. It finds particular application to XML documents, and will be described with particular reference thereto.

Extensible Markup Language (XML) is a widely used markup language which aids information systems in sharing structured data, encoding documents, and serializing data. Within XML and other markup language documents, there may exist many links (such as URL's) within the document that provide meaning and purpose to the document. Although the links inside the document are precisely defined through their syntactic and semantic structure, it is difficult and time-consuming to gather information about the context in which the links are used and where they are located inside a given document.

In a best case scenario, an XML document instance is compliant with an XML schema, e.g. XHTML, and thus it is possible to know where such a reference can be found, e.g., inside any img element, and more precisely, inside the value of its href attribute. The semantics of the reference is implicitly defined by the informal description of the HTML standard (it points to an image; it must be fetched through the URL and incorporated into the visual representation of the containing document).

However, many specific transformation operations can be envisioned which are focused on these referential objects. Currently, there are no methods or tools that simplify these operations and make them more reliable and easier to specify.

The present exemplary embodiment provides a system and a method for expressing link specific schemas, validations and transformations which can be complementary to general purpose schemas.

BRIEF DESCRIPTION

In one aspect, a computer-implemented method for processing links in a markup language document is provided. The method includes providing a specification in computer memory, the specification comprising at least one link description rule and at least one link processing rule for processing links which satisfy the link description rule; The method includes inputting a markup language document to computer memory and processing links in the markup language document in accordance with the at least one link description rule and the at least one link processing rule of the specification to generate processed data. The processed data includes at least one of a modified markup language document and data derived from the markup language document. The method further includes outputting the processed data.

In another aspect, a computer-based system for processing links in a markup language document is provided. The system includes a processor for controlling operation of the system; an optional specification parser stored in computer memory for parsing a specification, an optional markup language document parser stored in computer memory for parsing an input markup language document, and at least one of a link validation module, a link transformation module, and a dependency extraction module stored in memory. The link validation module, link transformation module, and dependency extraction module are configured for performing a process on a markup language document in accordance with the rules provided by a specification.

DETAILED DESCRIPTION

Figure 1:
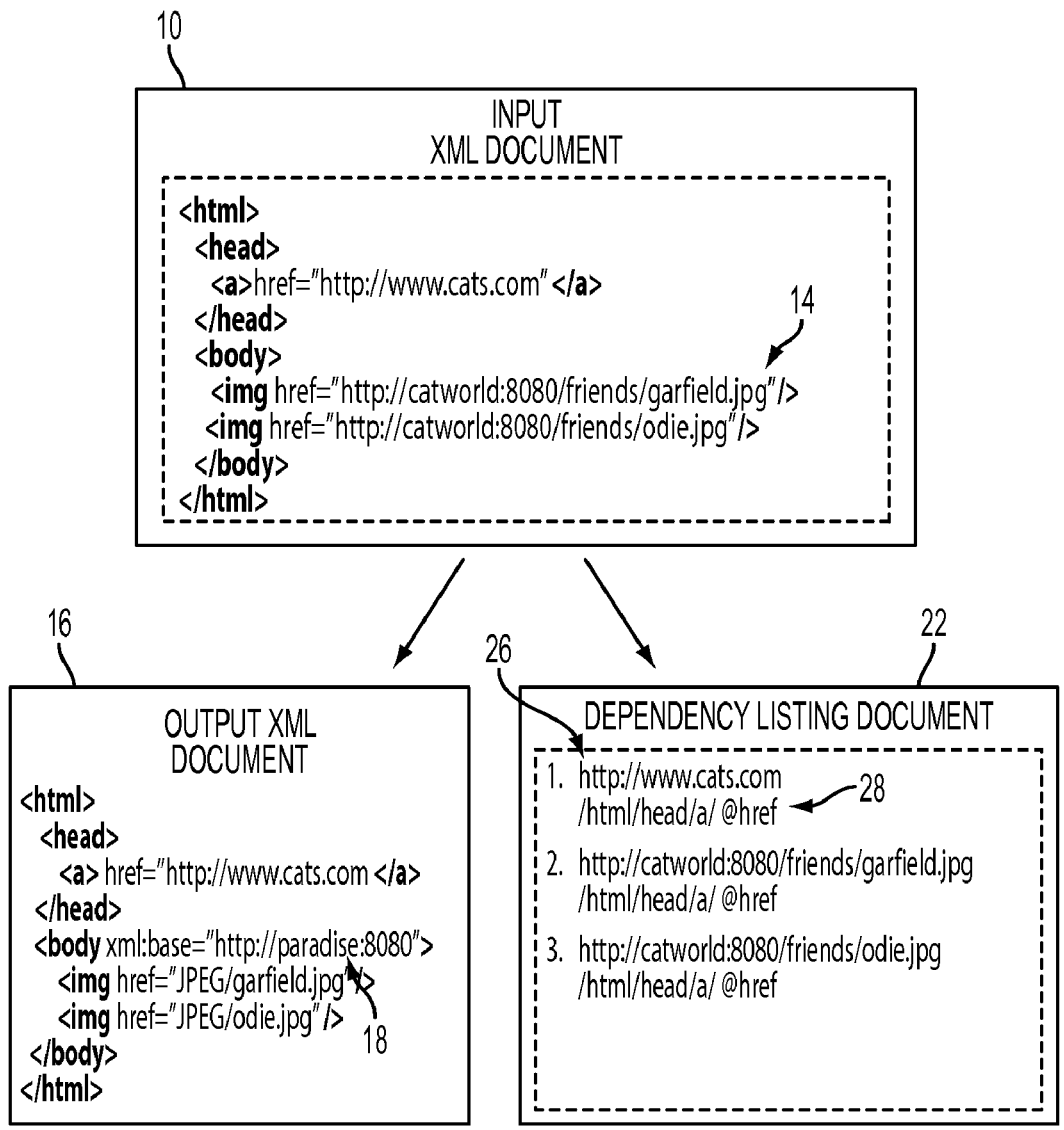
FIG. 1 graphically illustrates an input XML document instance (also known as a "markup language document") and a processed XML document instance (a modified markup language document) and a list of links which may be generated from the input XML document in accordance with one aspect of the exemplary embodiment.

Aspects of the present exemplary embodiment relate to a system and method for expressing knowledge about links common to a family of markup language document instances and to exploit this knowledge in order to perform processing operations, such as validations, transformations, and/or derivations of the corresponding markup language instances. The method can be understood as a way to express link specific schemas, validations and transformations. It is also complementary to general purpose markup language schemas.

The exemplary embodiment uses XML as the chosen markup language. However, any other current or future markup language may be used.

A "family of markup language document instances" refers to a group of XML documents which comply with the same XML schema, so that each document applies rules for validations, transformations, and derivations in the same way.

A "target resource" or simply, a "resource" refers to a location of an external object, such as a document, image, web page, or the like, to which a particular link is associated.

Although the referential objects in a conventional XML document are precisely defined through their syntactic and semantic structure, there is very little information about the context in which they are used and where they are located inside a given document. In one embodiment, an XML document instance is compliant with an XML schema, e.g. XHTML, and thus it is possible to locate such a reference, e.g. inside any img element, and more precisely, inside the value of its href attribute. The semantics of the reference is implicitly defined by the informal description of the HTML standard (it points to an image; it must be fetched through the URL and incorporated into the visual representation of the containing document).

There are currently two ways (inside the XML standard) for identifying and designating items inside or outside a document. The first one is based on ID/IDREF mechanisms which only apply to intra-document references. The second one, more general, is based on URL (universal resource locator) that has been historically derived into several variants (e.g. URI, universal resource identifiers; IRI, internationalized resource identifier; URN Universal resource name), each having different intended uses and slight lexical variations. The embodiment described herein is focused on the second kind of references. According to the related standards, such references have a syntactic structure that enables describing the protocol used for accessing resources over networks, the address of the server providing the resource, the path which uniquely designates the object to be accessed, and in some cases the fragment inside the document (i.e. a unique element identifier) and/or parameters. For instance the URL http://ds-1/example/dog.jpeg designates an object located on the "ds-1" server and accessible through the "http" protocol. This object is called "dog.jpeg" and the server is supposed to find it through the path "/example" before delivering it back to the caller that invoked the protocol.

The terms link and reference, which are used interchangeably herein, refer to any reference to an external object, i.e., an object, such as a document, which is not located within the document itself, but is located elsewhere, such as on a remote server and which can be fetched therefrom by accessing the link. Exemplary types of link include URL, URN, URI, IRI, XRI, and XLink (either relative or absolute) that can be found in a given XML document instance. Each link is generally in either the form of an attribute or a text node in the XML document. Once parsed, an XML document is composed of an element node, attribute nodes or text nodes. The World Wide Web Consortium is the current international standards organization that maintains the standards for the link types and XML specifications set forth above, although it is to be appreciated that other protocols for expressing link types that are hereafter developed are also contemplated.

To illustrate aspects of the exemplary embodiment, FIG. 1 illustrates a portion of an exemplary instance of an XML document 10. As illustrated in FIG. 1, the document 10 includes a link 14, such as a URL, or the like. The document 10 may include many such links, including links of different types. An output XML document 16 is also shown to illustrate a transformed link 18 (generated from link 14). FIG. 1 also illustrates a dependency listing document 22 containing a list of links derived from the markup language document 10 and example associated meta-data 28.

Figure 2:
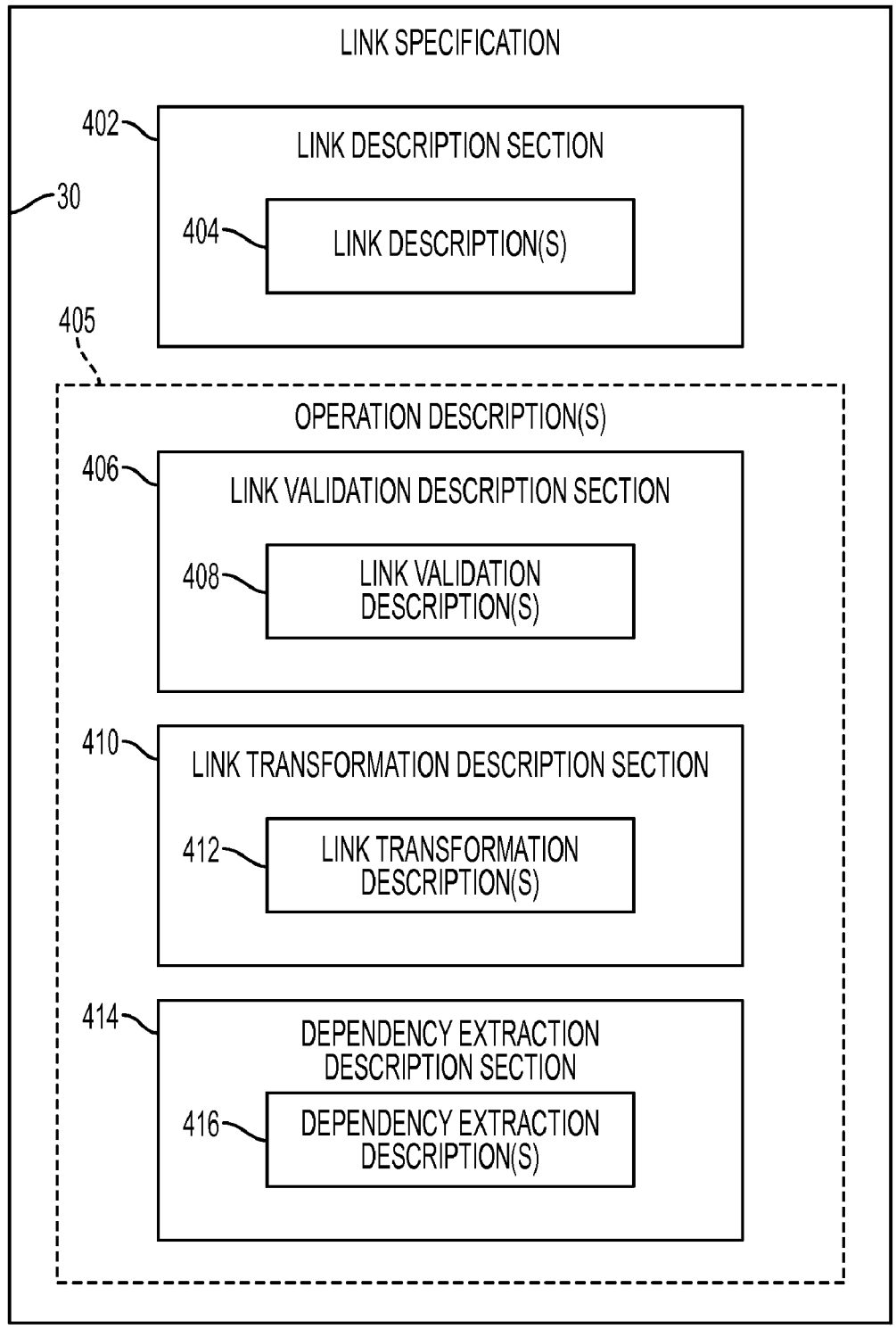
FIG. 2 is a functional block diagram of an input specification.

FIG. 2 illustrates components of an exemplary link specification (specification) 30. Such a specification 30 is used in the exemplary method to specify how the XML document is processed, with regard to its links, and is described in greater detail below. The specification 30 may be embodied in a tangible computer readable medium such as a disk, etc or embodied in a carrier wave. The specification includes a number of components 402, 406, 410, 414 which identify the links to be processed and what processing operations are to be performed (although not necessarily providing the instructions as to how this processing is to be performed). The link description section 402 is always required in a specification 30. However, only one of the remaining sections (link validation description 406, link transformation description 410, and dependency extraction description 414) is required for a specification 30, although the specification may contain more than one of the remaining sections. The link description section 402 should be the first section listed in the specification 30 as it contains information used by the remaining components. The remaining components 406, 410, 414 in the specification 30 may be arranged in any order. As shown in FIG. 2, the links specification 30 conceptually includes an operation descriptions section 405 containing one or more operation descriptions 408, 412, 416, which are interpretable and executable by a computer system for processing an input XML document, such as document 10. The operation descriptions section 405 consists of at least one of the following components: a link validation description section 406, which includes link validation descriptions 408, a link transformation description section 410, which includes link transformation descriptions 412, and a dependency extraction description section 414, which includes dependency extraction descriptions 416.

Figure 3A:
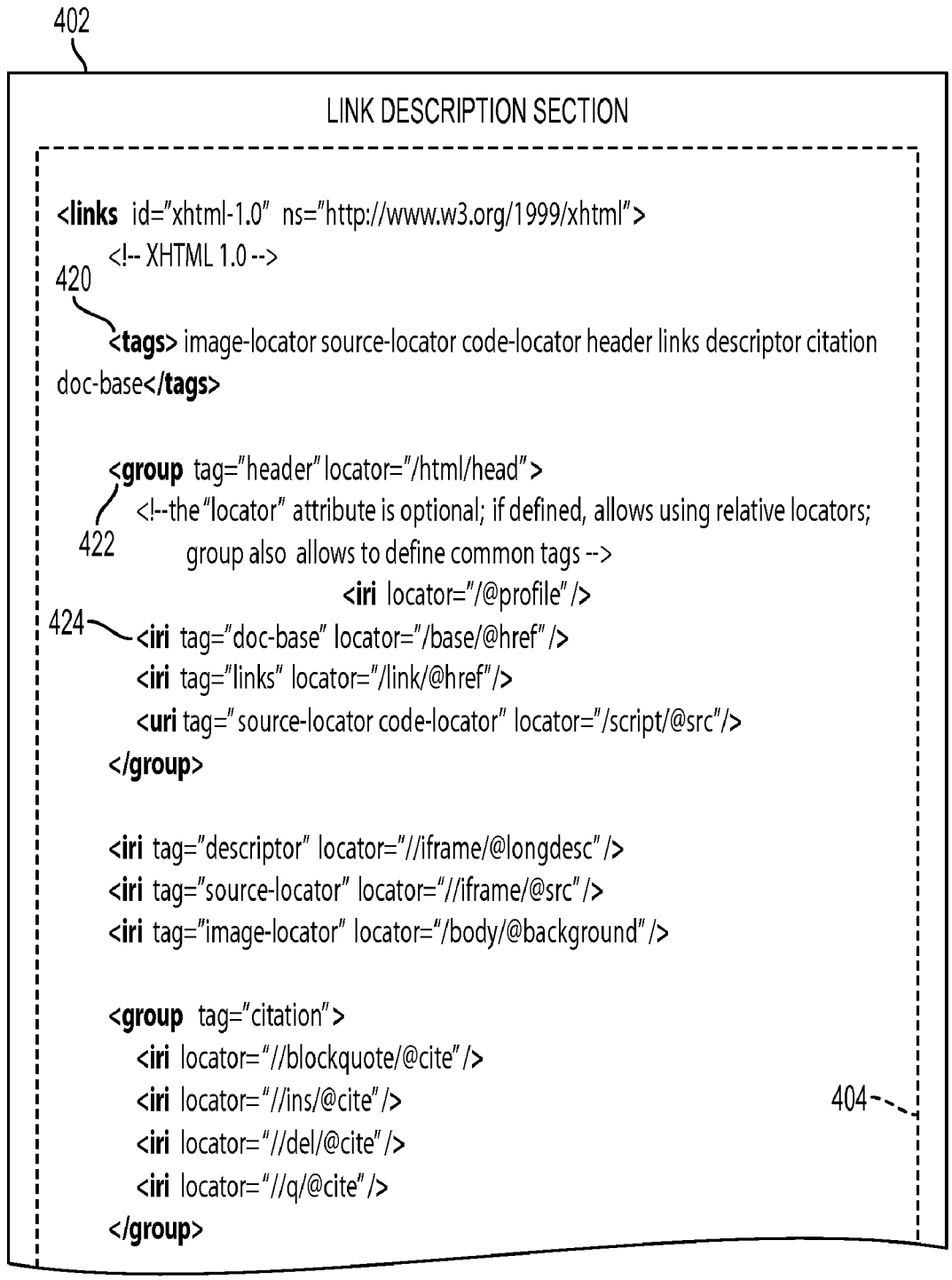
FIG. 3 is a detailed view of the link description section of the input specification of FIG. 2.

FIG. 3 illustrates an exemplary link description section 402. This component specifies the types of links to be processed and where they are to be located in the XML document to be processed. The link description section 402 includes link descriptions 404. The link description section 402 optionally begins with a "tags" element 420 which lists all of the tags to be defined in the section 402. If the tags element 420 is defined, then the tags list is considered exhaustive and all of the tags listed within the link description section 402 must be defined in the section 402. If the tags element 420 is not defined, then each individual link description 424 or group of link descriptions 422 may be tagged individually. "Group" elements 422 are used to give multiple individual link descriptions 424 the same tag and to later refer to one or several link descriptions through the tag name.

Figure 4:
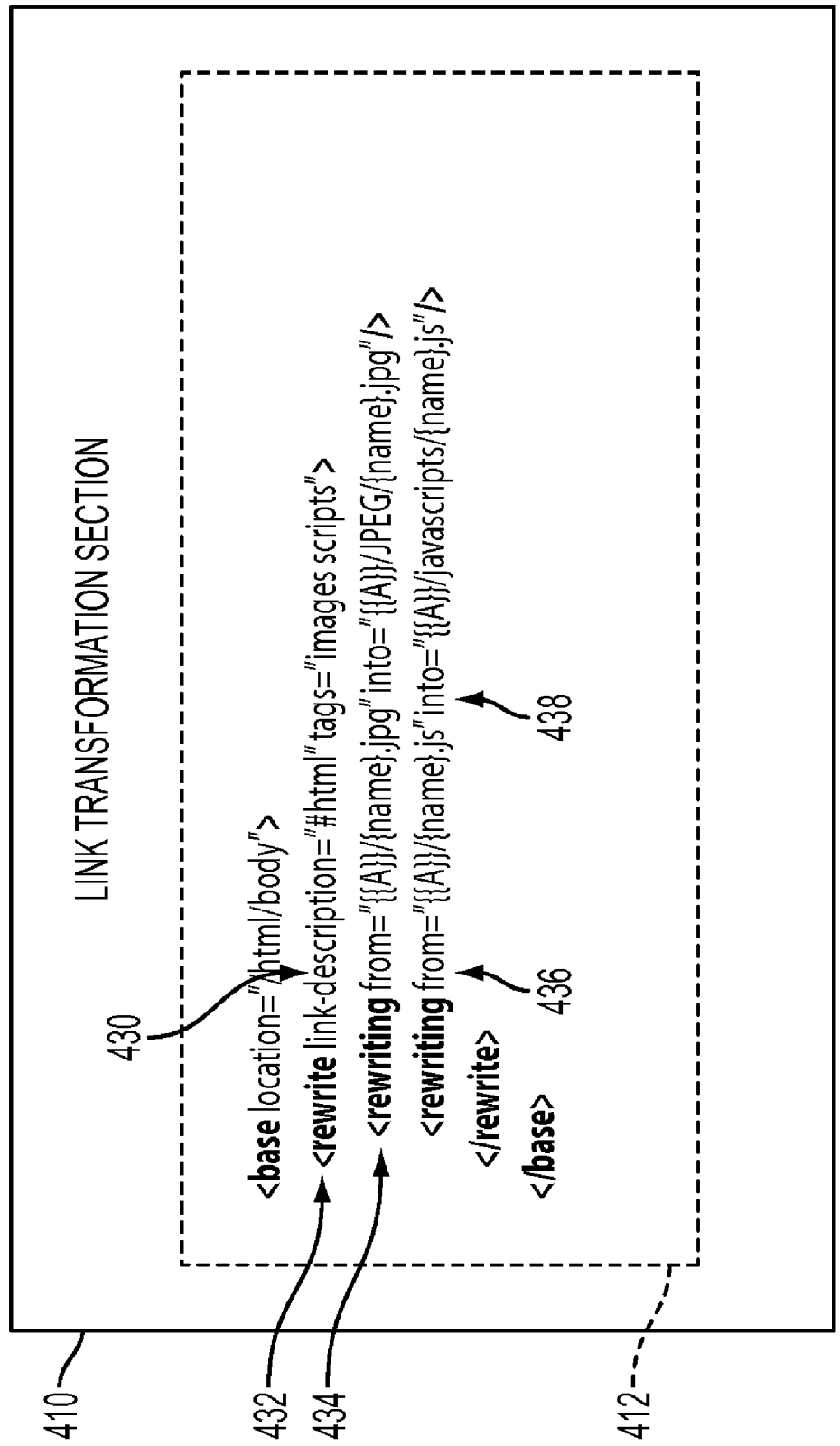
FIG. 4 is a detailed view of the link transformation section of the input specification of FIG. 2.

FIG. 4 illustrates an exemplary link transformation section 410 containing link transformation descriptions 412. In the exemplary embodiment, each "rewrite" element 432 contains one or more "rewriting" elements 434. The "rewriting" elements 434 describe how to transform each link described by a given tag 430. Each "rewriting" element 434 will contain a "from" attribute 436 and an "into" attribute 438. The expressions described in the from and into attributes 436, 438, are in the form of a modified regular expression language. Thus, in FIG. 4, any link in a markup language document 10 that meets the criteria for the link-description tag 430 in the link description section 402 (FIG. 3) and matching pattern 436 will be transformed to the "into" pattern 438.

As can be seen from FIGS. 3 and 4, the links specification 30 is of itself an XML document which is parsable by an XML document parser.

Figure 5:
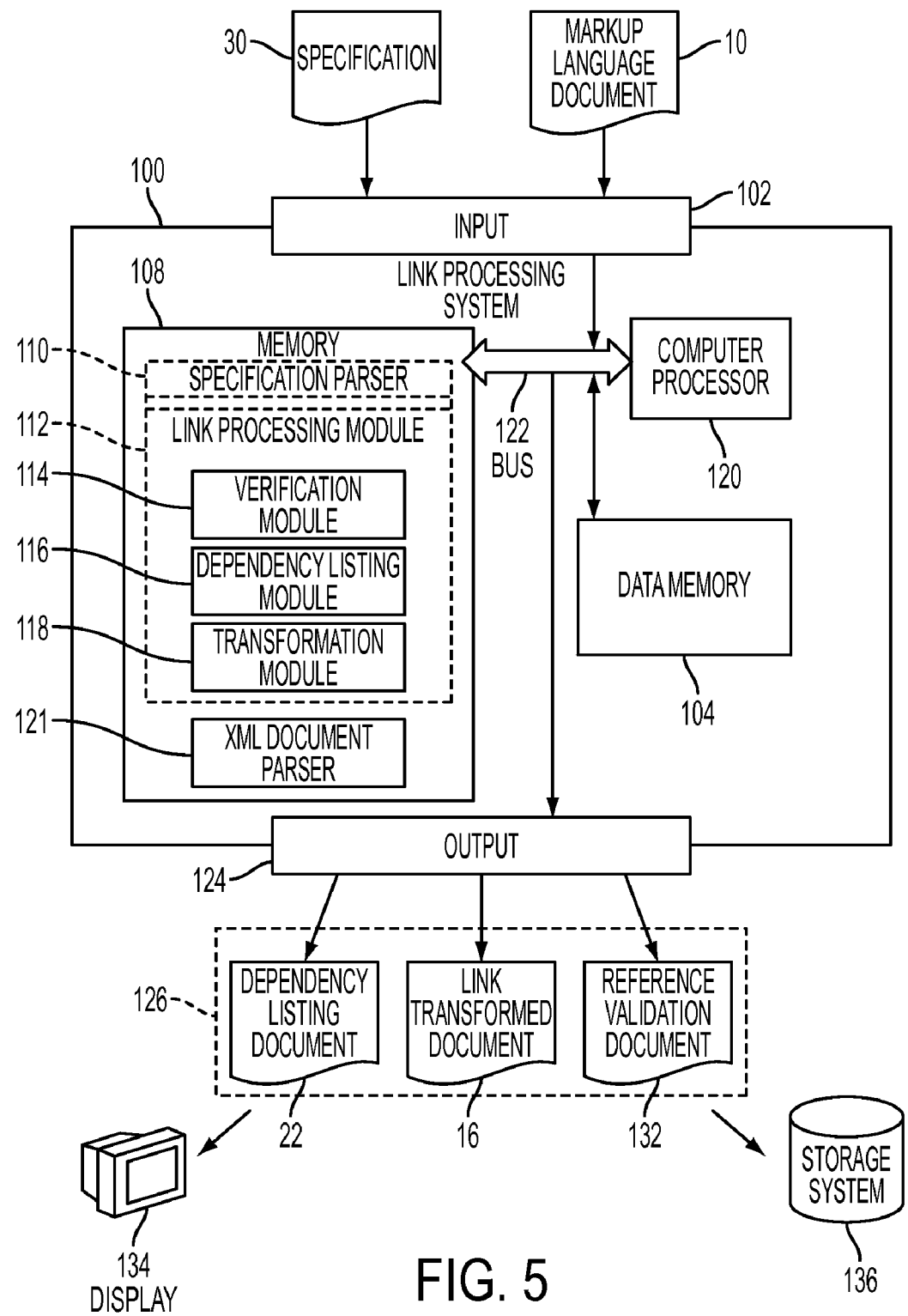
FIG. 5 is a high-level overview of an exemplary system for handling references in XML documents in accordance with another aspect of the exemplary embodiment.

FIG. 5 illustrates an exemplary system 100 for processing links. The exemplary system is a computer system. The system 100 includes an input 102, for receiving an input document 10 and a specification 30. Prior to inputting, the links specification 30 may be stored in any suitable tangible media such as a ROM or RAM drive or may be input into the system in the form of a carrier wave, e.g., via the Internet. Alternatively, the links specification is generated within the computing device 100, itself. The input may include a modem link, a wired or wireless connection, USB port, floppy or hard disk receiver, or the like.

The system 100 includes data memory 104 for storing an input XML document 10 being processed. Specification 30 is also stored in computer memory, such as memory 104 or a separate memory. Main memory 108 of the system stores a specification parser 110 and a link processing module 112. The specification parser 110 parses the input specification 30 in order to extract the descriptions 404, 408, 412, 416 within the specification 30. The links processing module 112 may be implemented as hardware or software or a combination thereof. In the exemplary embodiment, the links processing module 112 comprises software instructions in the form of execution modules 114, 116, 118, stored in main memory 108, which are executed by a computer processor 120, which may also execute the instructions for the links parser. The software components 114, 116, 118, are configured for processing links exemplified by link 14 (FIG. 1) in the document 10 in accordance with the links specification 30. In particular, the verification module verifies that links are in conformance with link validation descriptions 408 and is configured for generating a reference validation document 132 indicating whether or not the links are in compliance. The dependency listing module creates a list 22 of dependencies for the document links, if specified by the specification 30 with a dependency extraction description section 414. The transformation module 118 transforms links in accordance with the rewrite descriptions of the specification, if specified by the specification 30 with a link transformation description section 410. The processor 120, such as the computer's CPU, may control the overall operation of the computer system by execution of processing instructions stored in memory 108. An XML document parser 121 similar to specification parser, may also be stored in memory for parsing XML documents 10. Alternatively, a single XML parser 110 is configured for parsing the specification 30 as well as input documents to be processed. Components 104, 108, 120, of the computer system may be connected by a data control bus 122. The input document is thus interpreted by the specification parser 110 and executed by the link processing system 100 so as to perform operations on an input document 10.

The computer 100 includes an input/output device 124, which outputs processed data 126, such as one or more of a dependency listing document 22, a link transformation document 16, and a reference validation document 132. The exemplary output 124 is linked by a wired or wireless link to one or more of a display 134, such as a screen or monitor, and a storage system 136, where a set of processed documents 16 may be stored, optionally together with corresponding dependency listing documents 22 and reference validation documents 132.

As will be appreciated, links processing system 100 may comprise one or more computing devices, such as a personal computer, PDA, laptop computer, server computer, or combination thereof. Memories 104, 108 may be integral or separate and may represent any type of computer readable medium such as random access memory (RAM), read only memory (ROM), magnetic disk or tape, optical disk, flash memory, or holographic memory. In one embodiment, the memories 104, 108 comprise a combination of random access memory and read only memory. In some embodiments, the processor 120 and memory 108 and/or 104 may be combined in a single chip.

Figure 6:
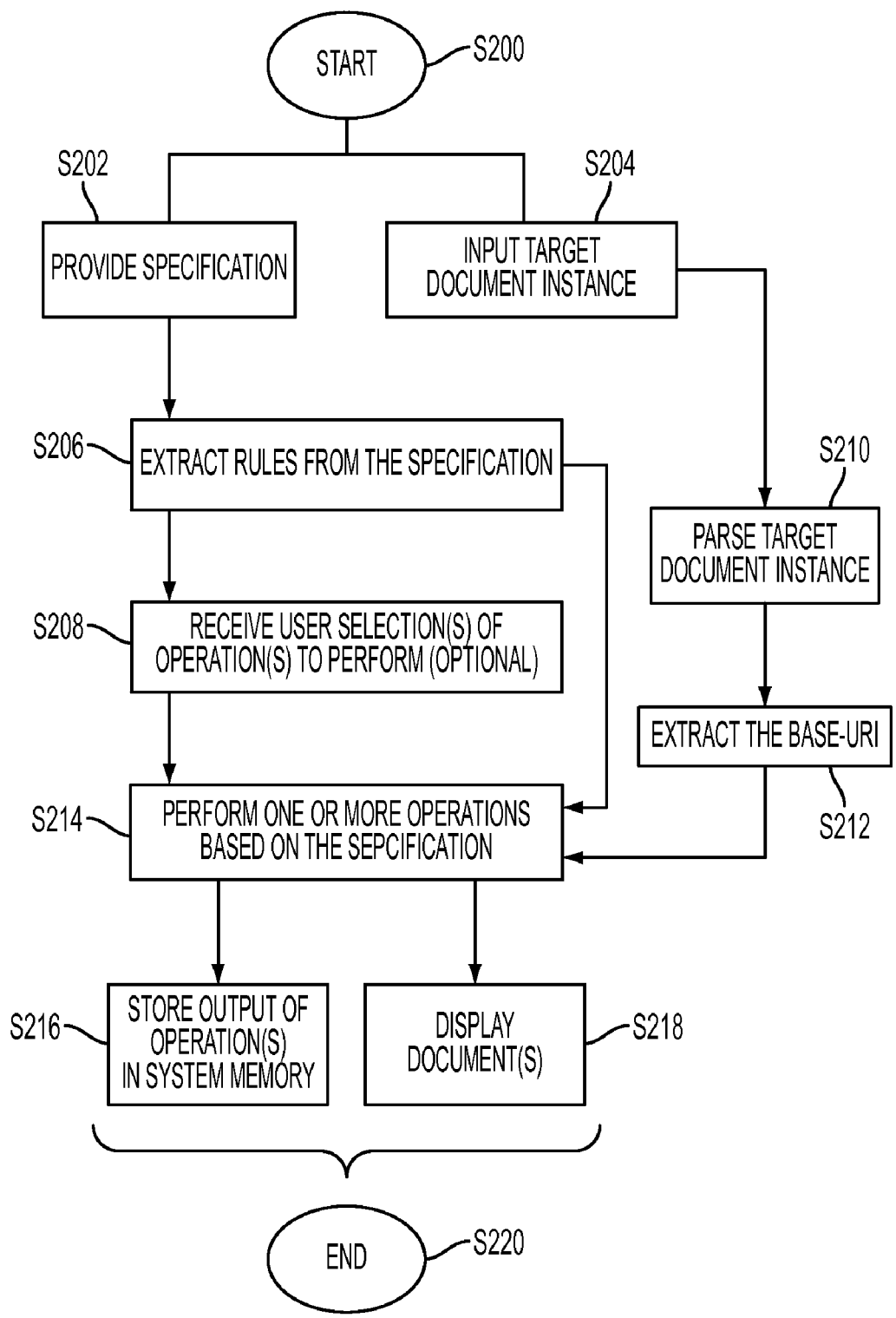
FIG. 6 is a flow diagram illustrating a method for handling references in XML documents in accordance with another aspect of the exemplary embodiment.

FIG. 6 illustrates a method for processing links which can be performed with the system of FIG. 5. The method begins at S200.

At S202, a specification 30 is provided to the input 102 (if it has not already been created and stored in the system).

At S204, a markup language document 10 is input to the system via the input 102 (or a separate input device) and stored in volatile memory 104.

At S206, the specification parser 110 parses the specification 30 and extracts all the rules 404, 408, 412, 416 from the specification 30.

At S208, the link processing system 100 optionally receives user input selecting one or more operations (S302, S306, S304, described below) to perform.

At S210, the markup language document 10 is parsed.

At S212, base-uri values are extracted from the markup language document 10. The base-uri is the URL that describes the localization of the link instance to be processed. This information is used in order to solve/normalize the so-called relative links (as opposed to absolute links), that is, links containing no information on the host localization and the access protocol to use.

Figure 7:
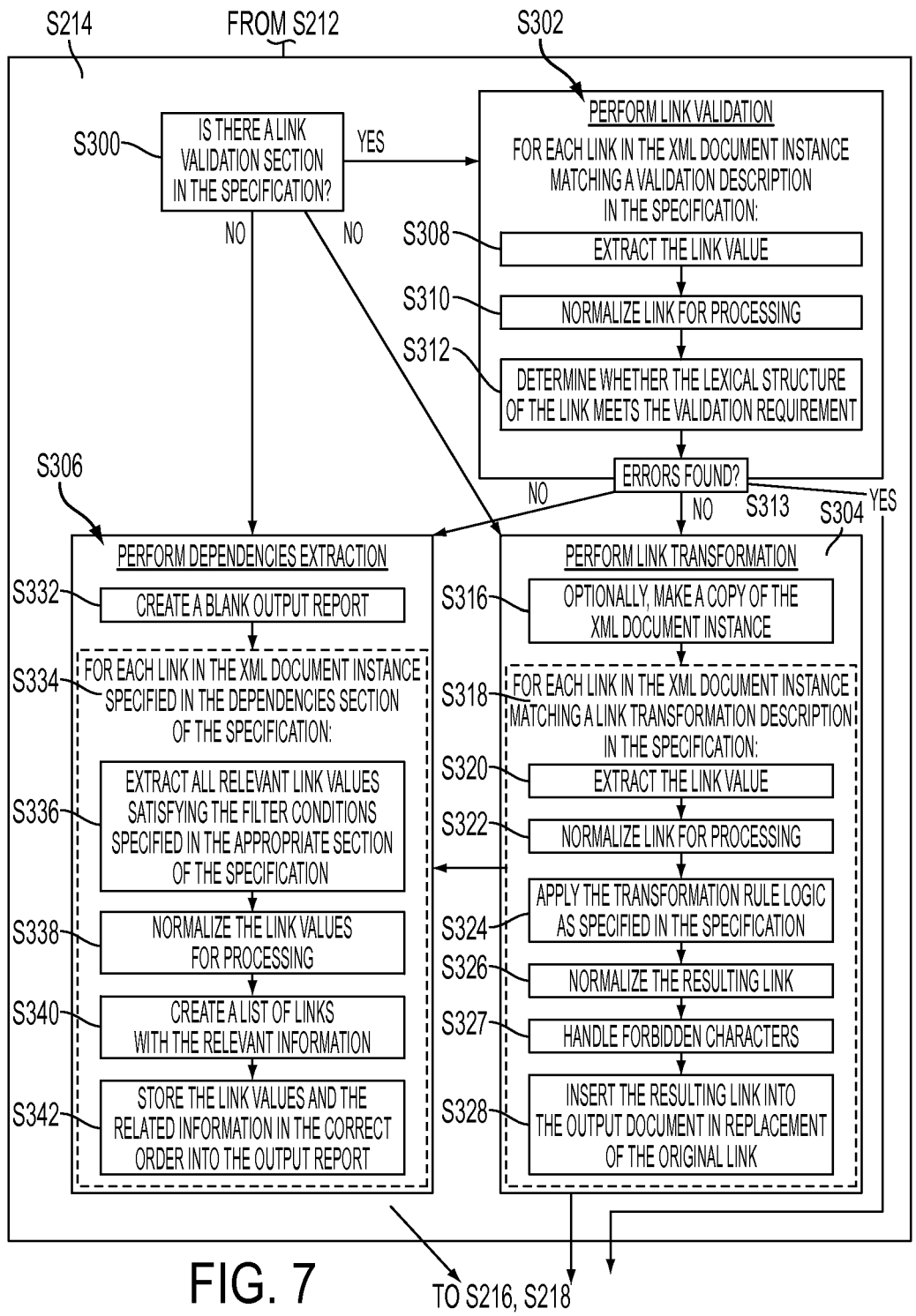
FIG. 7 is a flow diagram illustrating part of the method for handling references in XML documents of FIG. 6.

At S214, one or more link processing operations are performed. The link processing operations can be performed in any order, but the link verification, when specified, is always performed first so that detection of any errors can prevent further processing (as shown in FIG. 7).

At S216, the output 126 of the performed operations is stored in a memory storage system 136.

At S218, the output 126 of the performed operations is displayed on one or more of a monitor and display 134.

The method ends at S220.

Specific aspects of S214 are illustrated in FIG. 7 and are described in greater detail below.

Further details of the system and method will now be described.

In the exemplary embodiment, knowledge about links is formalized into a specification language that:

1. describes link location and typology inside a family of XML documents in terms of a set of link descriptions 404 (FIG. 2); and
2. tags these link descriptions 404 in such a way that they can be further designated and reused either individually or collectively.

With reference to FIG. 7, operations performed on the XML document instances 10 can use the link descriptions 404 in order to perform one or more of the following:

1. verify the compliance of links 14 according to standards 408 describing properties that these links must satisfy (e.g., their lexical and syntactic structure)—S302 (FIG. 7) performed by verification module 114 (FIG. 5),
2. check the conformance of the links to specific or general properties (e.g., a URI may be required to be relative, or to match a given pattern),
3. rewrite some links into other links (reference transformation), depending on matching patterns, side conditions of source document 10 as well as side conditions of referenced objects (link targets) (S304), and
4. generate a list 22 of all relevant links 14 (as defined by the specification) contained in the instance 10 (dependencies), with related useful meta-information such as the path expression that uniquely locate them inside the hierarchical structure and the type of link (URI, IRI, XLink, . . . ) (S306).

The exemplary embodiment allows, among other useful applications, concise and efficient descriptions of links that can be heavily reused, enabling adequate descriptions of main link-based operations desired in XML processing environments, especially link relocation for packaging clusters of documents and associated resources, validation of link properties with respect to security, conformance to a predefined selection of HTTP servers, simplification and normalization of link representation inside a given XML document instance 10, and smooth redirection of database requests hidden inside the structure of links.

"Link transformation," (S304) as used herein, refers to an operation which modifies the way in which a link 14 is expressed or modifies the way in which a referenced object linked to the document by the link is accessed. Transformation operations which may be performed on identified links within an XML document by the exemplary system and method may include one or more of the following:

1. link relocation, which includes changing the external environment of a given instance 14 (for instance, changing an absolute reference to an external server to a link pointing to a local cache where the target resources are stored);
2. document and resource packaging, which may include building an archive (e.g., in a data storage system 136) containing all dependent resources under a suitable directory structure;

3. selective link stabilization, which may provide for substitution of a reference by another pointing to the same resource(s), but via a storage system that guaranties the long term stability of the access;
4. static xml:base attribute processing, which interprets the xml:base attribute according to the W3C standard (or other protocol), but as a standalone operation; and
5. static XInclude resolution processing, which interprets the XInclude inclusion tags as a standalone operation. This allows for a more powerful way to merge XML documents.

The present exemplary embodiment can be understood as a way to express link specific schemas, validations and transformations.

In order to express the high level properties of links 14 and their localization inside instances 10, the exemplary embodiment provides a specialized language and dedicated abstractions. In order to enable the link transformation processes, a link processing module 112 containing one or more individual link operation modules 114, 116, 118 is provided (FIG. 5). Once captured in an adapted format, the link descriptions proposed herein may be used for specifying almost any markup language link-related operations.

The exemplary embodiment thus relies on a specification method (as embodied in the exemplary specification 30), a specialized matching language, and a link processing module 112, which are described in further detail below.

The exemplary specification illustrated in FIG. 2 allows the following operations to be performed for each link 14 or a selected set of links in a document instance 10:
1. express link features by means of four separate sections:
    a. the link typology and localization (links description 404), expressed in an appropriate sublanguage, typically but not exclusively, XPath;
    b. the link's expected properties (validation description 408) This part expresses properties that links (or a group of links) must have inside a given XML document instance 102 in order to be considered as valid,
    c. the link transformation rules (link transformation description 412), which includes:
        i. transposition rules (selected links are eventually normalized, matched against some pattern and rewritten)
    d. dependency extraction rules (dependency description 416)
2. identify, group and designate link descriptions 404. This allows the user (or system) to attach one or several tags 420 to link descriptors 404, and offers a mechanism for factorizing the tag assignment. Tags are simple labels intended to abstract over the semantics of links and to memorize them easily.

Operations 1 and 2 above allow the user to express bindings between the descriptive section and the other sections through a convenient designation mechanism. Hence there is little overhead, and the method enables reusing link descriptions 404 in various applicative contexts.

The specialized matching language is designed to optimize the ratio of expressive power versus complexity. In particular, it simplifies the task of expressing the structural properties of links, the (pre/post) processing and transformation of links. It does so by offering suitable abstractions. By relying on the inherent lexical/syntactical structure of links, it avoids the burden of mastering general regular expression languages, which can be tricky and error prone for a non-specialist.

The link processing module 112 provides for some or all of the following operations to be performed:
1. use the link validation descriptions 408 to derive link validation rules to perform, via an interpreter or a compiler, a validation on any instance 10 expected to comply with the description; the validation may output an error report 132 including the faulty links, their location in the document and an indicative error message or any other relevant information, including successful validation;
2. use the link transformation descriptions 412 to derive link transformation rules to perform, via an interpreter or a compilation/execution scheme, the modification of links and possibly generate a new document instance 16 in which relevant links have been modified according to the transcription rules 412 (but without any other structural changes); this operation may output a log report indicating which links have been processed and any other relevant information;
3. use the dependency extraction descriptions 416 to derive dependency extraction rules in order to produce, via an interpreter or a compiler, a list of all dependencies. A dependency is a resource that the given instance 10 is sensitive to, as estimated by the designer who specified the dependency rules (order may be significant, if specified by a rule). The list of dependencies may be produced in any suitable XML format expected to ease further automated processing.

Specification—Link Descriptions

In the specification 30, links are described in a dedicated section 402 which is marked with a special keyword (in this instance the word "link-description" is used) and a header which contains at least:
  a unique logical name for this section, which will be used for designing it without ambiguity;
  the namespace of the target document, if any;
  the URL of one or several schemas to which the target document instance 10 is expected to comply with (optional); and
  the list of all tags used to annotate the link descriptions 404. This list is optional, but if provided, it defines exactly and exhaustively the authorized tags. Tags are names with any relevant lexical structure, as commonly found in the art.

Inside the link description section 402, the designer of the description can input as many descriptors as needed. The descriptors can even be embedded in grouping subsections. These subsections are decorated with a tag list; the meaning of this grouping subsection is that all embedded description will be automatically assigned the associated tags. It is thus a way to simplify the specification of descriptors (see the example below).

Descriptor Keywords

The descriptors themselves may be specified through one of the following keywords:

URL stands for Universal Resource Locator and is commonly used to give information (inside the link itself) on where a resource is located, with the implicit understanding that an action is to fetch this resource in order to incorporate it inside the document (e.g. an image, a sub-part) or to interpret it with respect to the current document (e.g. a script).

URN stands for Universal Resource Name and is used to name resources in a worldwide unique and temporally stable way. Thus no specific action or usage is associated with them, they are just used to designate things (e.g. in PUBLIC field of DTDs); however, they often have a specific lexical structure, mainly a "urn" scheme and ':' separated sequence of characters (e.g. urn:example:animal:ferret:nose).

URI stands for Universal Resource Identifier and is commonly used to identify a resource in a broader way. A URI can identify both physical and abstract resources.

The abstraction hierarchy and relationship between URL, URN and URI can be defined as follows:

A URI can be further classified as a locator, a name, or both. The term 'Uniform Resource Locator' (URL) refers to the subset of URIs that, in addition to identifying a resource, provides a means of locating the resource by describing its primary access mechanism (e.g., its network 'location'). The term 'Uniform Resource Name' (URN) has been used historically to refer to both URIs under the 'urn' scheme (RFC2141), which are required to remain globally unique and persistent even when the resource ceases to exist or becomes unavailable, and to any other URI with the properties of a name. (See http://www.ietf.org/rfc/rfc3986.txt)

From the lexical point of view, a URI only uses UCS (Universal Character Set) code points. These code points are converted to bytes through the UTF-8 encoding. When a character doesn't belong to the unreserved subset, it can be escaped using a "% HH" pattern before encoding (H stands for any hexadecimal letter taken from the 0-9A-F alphabet).

IRI stands for Internationalized Resource Identifier and has the same meaning and syntactic structure as URI, but a more abstract lexical structure. An IRI uses an extended character set supporting foreign languages (foreign should be understood here as non-English), including right-to-left writing languages such as Arabic. An IRI can be transformed into a URI (thus allowing physical access) through a character normalization phase followed by an escaping mechanism based on % HH patterns.

HREF refers to "Hyper-references" defined in the vocabulary of some languages such as HTML. HREF links have a specific encoding policy, using a similar escaping mechanism as URI, but with stricter character set (namely, ASCII).

XInclude refers not only to the link associated with it, but to the whole node. This element is meant to express document inclusion, a not-so-simple mechanism whose semantics is as precisely specified in a technical document, such as the W3C recommendation available at http://www.w3.org/TR/xinclude/. This mechanism makes use of a predefined attribute "href" containing a specifically encoded URI. According to section 4.2.2 of the XML 1.1 specification (at http://www.w3.org/TR/2004/REC-xml11-20040204/#sec-external-ent):

System identifiers (and other XML strings meant to be used as URI references) MAY contain characters that . . . must be escaped before a URI can be used to retrieve the referenced resource. The characters to be escaped are the control characters #x0 to #x1F and #x7F (most of which cannot appear in XML), space #x20, the delimiters '<' #x3C, '>' #x3E and '"' #x22, the unwise characters '{' #x7B, '}' #x7D, '|' #x7C, '\' #x5C, '^' #x5E and '`' #x60, as well as all characters above #x7F. Since escaping is not always a fully reversible process, it MUST be performed only when absolutely necessary and as late as possible in a processing chain. In particular, neither the process of converting a relative URI to an absolute one nor the process of passing a URI reference to a process or software component responsible for dereferencing it SHOULD trigger escaping. When escaping does occur, it MUST be performed as follows:

1. Each character to be escaped is represented in UTF-8 [Unicode] as one or more bytes.
2. The resulting bytes are escaped with the URI escaping mechanism (that is, converted to % HH, where HH is the hexadecimal notation of the byte value).
3. The original character is replaced by the resulting character sequence.

XLink as for XInclude, refers to a tag supposed to contain XLink related attributes (see www.w3.org/TR/xlink/); the specific href attribute from the XLink namespace is an URI. The general semantics constraints of XLink are captured by this descriptor.

XPointer describes a very rich mechanism (see www.w3.org/TR/xptr-xpointer/, www.w3.org/TR/xptr-framework/), based on URI and possibly using various selection languages (so-called schemes), one of them, most notably, extending XPath in order to designate one or several fragments of an XML document tree including textual fragments.

Each such descriptor is associated with a locator, which is an expression in a node selection language that defines where the link should be located in the document instance 10.

Table 1 is an example of XML syntax illustrating how this method can be used to describe links in an HTML document.

TABLE 1

```
<links id="xhtml-1.0" ns="http://www.w3.org/1999/xhtml">
  <!-- XHTML 1.0 -->
  <tags>image-locator source-locator code-locator header links descriptor citation doc-base</tags>
  <!-- if specified, "tags" element must exhaustively enumerate all tags used in the links description (order is not significant) -->
  <group tag="header" locator="/html/head">
    <!--the "locator" attribute is optional; if defined, allows using relative locators ;
       group also allows to define common tags -->
    <iri locator="/@profile"/>
    <iri tag="doc-base" locator="/base/@href" />
    <iri tag="links" locator="/link/@href"/>
    <uri tag="source-locator code-locator" locator="/script/@src"/>
    <!-- URI, as opposed to IRI do not accept non ascii characters; for those use IRI and it's escaping mechanism -->
    <!-- see http://www.ietf.org/rfc/rfc3987.txt for IRI's description -->
  </group>
  <iri tag="descriptor" locator="//iframe/@longdesc"/>
  <iri tag="source-locator" locator="//iframe/@src"/>
  <iri tag="image-locator" locator="/body/@background"/>
  <group tag="citation">
    <iri locator="//blockquote/@cite"/>
    <iri locator="//ins/@cite"/>
    <iri locator="//del/@cite"/>
    <iri locator="//q/@cite"/>
  </group>
  <group tag="references">
    <iri locator="//a/@href"/>
    <group locator="//object">
      <iri locator="/@classid"/>
      <iri tag="code-locator" locator="/@codebase"/>
      <iri locator="/@data"/>
      <iri locator="/@archive" list="yes"/>
      <iri locator="/@usemap"/>
    </group>
    <iri tag="code-locator" locator="//applet/@codebase"/>
  </group>
  <group locator="//img">
    <iri tag="image-locator" locator="/@src"/>
    <iri tag="descriptor" locator="/@longdesc"/>
    <iri locator="/@usemap"/>
  </group>
  <iri locator="//area/@href"/>
  <iri locator="//form/@action"/>
  <iri locator="//input/@src"/>
  <iri locator="//input/@usemap"/>
</links>
```

Specification—Validation Section 406

Link validation is specified in a dedicated section 406 of the specification 30 labeled "validate" which contains at least one reference type from a link description section 402. The reference type definition can be located inside or outside the document containing the validate section (such as from a different specification). If no other information is specified, all links should be checked regarding the semantics specified. This means that when the validation is executed on a given target XML document instance 10, the links are extracted based on the localization information and are checked with respect to their type as detailed in the link description section in Table 1.

Additional constraints can be provided through one or many "properties" subsections in the validate section.

Each properties subsection applies to one or several link subsets designated through a list of one or several tags. Each tag may designate one or several links, depending on the link description section 402, as explained above. Each properties subsection is optionally identified through a unique identifier.

The properties may be specified through one or several descriptors as listed in Table 2:

TABLE 2 scheme defines the expected scheme, e.g. "http", "ftp" or "mailto"
absolute expresses that an absolute link is expected (i.e. the scheme and server location are provided)
relative expresses that a relative link is expected (the path, resource name and optionally fragments are provided; the scheme and server location are those of the base URI of the target instance 10)
matches(p) expresses that the link content must match the provided pattern p. This pattern is expressed according to the matching language described later.
path(p) expresses that the "path" part of the link must match the given pattern p. A "path" may be as defined at www.ietf.org/rfc/rfc3986.txt (section 3.3), as follows:
The path component contains data, usually organized in hierarchical form, that, along with data in the non-hierarchical query component, serves to identify a resource within the scope of the URI's scheme and naming authority (if any). The path is terminated by the first question mark ("?") or number sign ("#") character, or by the end of the URI
fragment(p) expresses that the "fragment" part of the link must match the given pattern p. A "fragment" may be as defined at www.ietf.org/rfc/rfc3986.txt (section 3.5). It states in part: The fragment identifier component of a URI allows indirect identification of a secondary resource by reference to a primary resource and additional identifying information. The identified secondary resource may be some portion or subset of the primary resource, some view on representations of the primary resource, or some other resource defined or described by those representations. A fragment identifier component is indicated by the presence of a number sign ("#") character and terminated by the end of the URI."
query(p) expresses that the "query" part of the link must match the given pattern p. A "query" may be defined as at www.ietf.org/rfc/rfc3986.txt (section 3.4) as follows: The query component contains non-hierarchical data that, along with data in the path component serves to identify a resource within the scope of the URI's scheme and naming authority (if any). The query component is indicated by the first question mark ("?") character and terminated by a number sign ("#") character or by the end of the URI.
target( ) expresses that the target reference is available at the time of the validation; one of several sub-descriptor can be specified, in order to make-it more precise.
mime-type This is a standardized notation for indicating the type of internet resources. See, for example, www.iana.org/assignments/media-types/ and www.mimetype.org.
namespace(ns) (makes sense only if the mime-type is text/xml or derived).
condition(p) requires checking if conditions p holds (typically, but not exclusively, p is a XPath qualifier expression).

Note that the namespace and condition properties require resolving the reference at validation time, and also possibly XML decoding and/or parsing.

In the exemplary embodiment, if no descriptor is specified, only standard (default) validations related to the nature of links are conducted.

An additional error message can be specified within each property descriptor, that will be used to report any property violation (e.g. matches(http://{*}:{*}/{*}, "an explicit port number is expected") will display the error message for non-matching link such as http://barnum/circus.jpg)

Specification—Transformation Section 410

Link transformations are specified in a dedicated section 410 of the specification 14 labeled "rewrite" which comprises a header having the following attributes:
1. link-description: the name of a link description section 402, against which link tags will be interpreted (mandatory)
2. normalize: take the value yes or no (defaults to yes if omitted); if set to yes, the relevant normalization process S322 will be performed on all links before applying the pattern matching operation (the exact nature of normalization operation depends upon the nature of link); if set to no, the pattern matching operation will be applied on the original link; note that however some normalization operation may occur due to standard XML processing, such as expansion of reference entities.
3. resolving-base: optionally specifies an URI that will be considered as the reference URI for solving relative link. It supersedes the xml:base information, if present, or the static-base-uri of the original document.

Beside header attributes, this section 410 may include one or many rewriting descriptors, which may be embedded inside a base descriptor.

Each base descriptor may include one or more of:
1. an optional "location" attribute which expresses where an xml:base attribute must be inserted inside the transformed document 130. When omitted, the xml:base attribute is inserted into the root node (of course, in any case, it is an inconsistency error if several base descriptors are allocated to the same node).
2. a "value" attribute which defines the content of the xml:base attribute. This must be an absolute URL. If omitted, the static-base-uri is used.

Each rewriting descriptor may have one or more of the following:
1. a tags attribute, which is a list of tag name corresponding to the links to be selected as candidates (all link descriptors are considered if the tags attribute is omitted),
2. a condition attribute, which optionally specifies an additional condition to be checked before trying to apply the rewriting (typically, an XPath expression),
3. a from attribute, which optionally specifies a pattern matching expression that must be successfully applied in order to rewrite the link; such pattern may define matching variables, and
4. an into attribute, which optionally specifies a new value for the link. This value may partially or totally reuse any pattern variables defined inside the from pattern.

In the case where a rewriting descriptor has no "from" and no "into" attribute, it may have one or more rewrite sub-descriptors, each rewrite sub-descriptor including a pair of "from/into" attributes. The meaning of this list is that for each candidate link, each rewriting is tried in order, until a matching "from" is found.

Table 3 and Table 4 show examples of rewrite descriptors.

TABLE 3

<rewrite link-description="../html/std.lnk" tags="images scripts">
  <rewriting from="{{*}}/{name}.jpg" into="./images/JPEG/{name}.jpg"/>
  <rewriting from="{{*}}/{name}.js" into="./javascripts/{name}.js"/>
</rewrite>

Note that after computing the rewritten link, if the rewriting descriptor is embedded inside a base descriptor, the result is checked against the value of the base descriptor, and made relative if required.

TABLE 4

```
<base location="/html/body">
   <rewrite link-description="#html" tags="images scripts">
      <rewriting from="{{A}}/{name}.jpg" into="{{A}}/
      JPEG/{name}.jpg"/>
      <rewriting from="{{A}}/{name}.js" into="{{A}}/
      javascripts/{name}.js"/>
   </rewrite>
</base>
```

The rewrite descriptor shown in Table 4 will, for example, transform the document in Table 5 (assuming the URL of the input document is http://paradise:8080/animals) into a rewritten document.

TABLE 5

```
<html >
   <body>
      <img href="http://catworld:8080/friends/garfield.jpg" />
   </body>
</html>
    into
<html >
   <body xml:base="http://paradise:8080" >
      <img href="JPEG/garfield.jpg" />
   </body>
</html>
```

The xml:base attribute attached to the body element has been extrapolated from the static-base-uri of the input document 10 (because no more precise information was provided).

Specification—Link Extraction Section (414)

Link (or "dependency") extraction is specified in the specification 14 in a manner similar to link transformation, through a dedicated section 414 labeled "dependencies" which may include some or all of the following attributes:

1 link-description: the name of a link description section 402, against which link tags will be interpreted (mandatory).
2 normalize-input: take the value yes or no (defaults to yes if omitted); if set to yes, the relevant normalization process S338 will be performed on all links before testing operation (the exact nature of normalization operation depends upon the nature of link); if set to no, all tests will be applied on the original link; note that however some normalization operation may occur due to standard XML processing, such as expansion of reference entities.
3 normalize-output: take the value yes or no (defaults to yes if omitted); if set to yes, the relevant normalization process will be performed on all links before storing the dependency (the exact nature of normalization operation depends upon the nature of link); if set to no, note that however some normalization operation may occur inside the output report due to standard XML processing, such as escaping or insertion of reference entities.
4 resolving-base: optionally specifies an URI that will be considered as the reference URI for solving relative link. It supersedes the xml:base information, if present, or the static-base-uri of the original document otherwise.
5 sorting: takes one of the following values {"document-order", "content-order", "tag-order"}, and expresses the method used to order the link dependencies stored into the dependency report 22. With document-order, links are organized in the same order as inside the original input document. Using content-order, links are alphabetically classified according to the lexical structure of the URL. The tag-order mode uses an alphabetical classification based on the tag name of the link, as defined by the link description section 402. If omitted, the sorting attribute defaults to "document-order".

The dependency extraction section 414 described above also comprises a list of sub-descriptors, each labeled "extract", and which may include some or all of the following attributes:

1 what (mandatory), a list of tags corresponding to the link descriptors 404 of interest.
2 matching(p) (optional), specifies a pattern that must match the link (otherwise, the link is not considered as a significant dependency).
3 condition(path) (optional), specifies a condition (typically, an XPath expression) the link has to fulfill in order to be considered as a significant dependency.
4 show-tag (optional), takes the value "true" or "false" (default). If true, the tag corresponding to the link is stored inside the dependency report 22 that will be generated by the operation.
5 show-location (optional), takes the value "true" or "false" (default). If true, the location of the link is stored inside the dependency report 22 that will be generated by the operation as an XPath expression that uniquely points to the link according to the link type.
6 normalize-input (optional), put the link under a normalized form (absolute and escaped) before testing filtering conditions.
7 normalize-output (optional), store the link under a normalized form (absolute and escaped).
8 resolving-base (optional, meaningful only if normalize attribute is set to true), serve as the base URL for relative-to-absolute link conversion.

Note that if no extract sub-descriptor is provided, all links found in the input document 10 are stored into the dependency report 22.

Pattern Matching Language

The pattern matching language which may be used in the exemplary embodiment is based on the "{" and "}" characters (braces) to serve as delimiters of pattern variables. Those characters have no precise meaning in the URI specification and do not belong to the standard alphabet or separator sets. Variables are named using any identifier built from any alphabet excluding the braces and the star "*". If a star is used instead a name (e.g. "{*}"), it means that the matching substring is not stored. Double braces (e.g. "{{*}}"), mean that the longest matching substring is expected, whereas the shortest match is returned for single braces.

Table 6 illustrates the various pattern matching mechanisms:

TABLE 6

| Pattern | Value | Result |
|---|---|---|
| http://{server}:{*}/{*}.jpg | http://barnum:80/circus/jumper.jpg | Matches:yes server="barnum" |
| | http://barnum:80/circus/acrobats/juggler.jpg | Matches |

TABLE 6-continued

| Pattern | Value | Result |
|---|---|---|
| http://{server}/{{path}}/{object} | https://barnum:80/circus/jumper.jpg<br>http://barnum:80/circus/jumper.gif | server="barnum"<br>Matches:no<br>Matches:yes<br>server="barnum:80"<br>path="circus"<br>object="jumper.gif" |
| | http://barnum:80/circus/acrobats/juggler.jpg | Matches:yes<br>server="barnum:80"<br>path="circus/acrobat"<br>object ="juggler.jpg" |
| http://{server}/{path}/{ object } | http://barnum:80/circus/jumper.gif | Matches:yes<br>server="barnum:80"<br>path="circus"<br>object ="jumper.gif" |
| | http://barnum:80/circus/acrobats/juggler.jpg | Matches:yes<br>server="barnum:80"<br>path="circus"<br>object=acrobats/juggler.jpg |

Validation of the Link Descriptions (S302)

The exemplary descriptions can be expressed through XML or any appropriate language. If the language is not based on XML, a bidirectional, lossless, translation to XML may be provided. This technique is used, for example, by the RelaxNG schema language (http://relaxng.org/), which provides both an XML based syntax and a so-called "compact syntax", strictly equivalent, and may be used herein for such non-XML languages.

In order to be consistent and usable, the link descriptions 404 should comply with specific properties that can be checked in order to assess the correctness of the specifications. These properties may include:
1. Wellformedness of the logical structure (correct occurrence of sections, subsections and attributes),
2. Correct use of tags (no dangling tag references, coherence of tag declarations if any), and
3. Correct structure of URI's.

These constraints can be captured using one or a plurality of standard XML schemas or any other custom method.

Link Processing Module 112

The basic algorithm of any processing component may functionally encompass three stages. The first two stages are the same for each operation. The third stage differs, depending on whether link validation, link transformation, or link (dependency) extraction is active. For the third stage, the link validation is performed first if there is a link validation section 406 in the specification 30 (S300).

The stages may be as follows:

Stage One: Parse the XML document instance 10 S210.

Stage Two: Extract any base-uri S212 (the URL that describes the localization of the instance to be processed). (Once stages 1 and 2 have been performed once, they do not need to be repeated for each subsequent module).

Stage Three varies, depending on the module:

For link validation S302, performed by verification module 114, Stage Three may proceed as follows: For each link specified in the link validation description of the specification:
  a. Extract the link value, using the localization information described in point above and through the tag designation mechanism S308.
  b. Perform a partial normalization of the link, according to information provided (deals only with escaping issues, depending on the kind of reference, as specified) S310.
  c. Verify that the lexical structure of link meets the validation requirement, depending on whether S312:
    i. The link structure is compliant with the declared link type
    ii. The link is verifying the condition (if provided)
    iii. The link is matching the pattern (if provided)
    iv. The link target is available (if this constraint is specified)
    v. The link target verifies the expected properties, if any such is specified (namespace, node selection condition)
  d. If no errors are found during validation, then proceed to either the link transformation or dependency extraction operations if either is specified in the specification S313. Else, if errors are found, then proceed to steps S216, S218.

For link transformation S304, performed by transformation module 118, Stage Three may proceed as follows: A step of copying the document instance may be performed S316, if it is desired to retain the original document 10. For each link specified in the link transformation description of the specification 30, S318 may include the following substeps:
  a. At S320, extract the link value, using the localization information described above, and through the tag designation mechanism.
  b. At S322, normalize the link, according to the information provided by the normalize attribute of the link transformation description 412. (If normalize is set to true, solves the relative references into absolute references, in accordance with the XML Base standard. Deal with escaping issues, depending on the kind of reference, as specified.)
  c. At S324, apply the rule logic as described above for rewriting descriptors.
  d. At S326, normalize the resulting link, with respect to xml:base mechanism, if required.
  e. At S327, optionally, handle forbidden characters inside the link, as required by its type (use escaping mechanisms if necessary—e.g. a space " " is escaped into "%20").
  f. At S328, insert the resulting link into the output document in replacement of the original link.

For link (dependency) extraction S306, performed by dependency listing module 116, Stage Three may proceed as follows: A blank output report may be created at S332. For each link specified in the dependencies section 414 of the specification 30 at S334 the following substeps may be performed:

a. At S336, extract all relevant link values satisfying the filtering conditions (perform prior normalization if required).
b. At S338, normalize the link (if required by the extract sub-descriptor) and order the links according to the specified ordering policy.
c. At S340, create an output report 22 with the relevant meta-information: for instance the date and time of the dependency extraction operation; the URL of the input document, the URL of the link dependencies specification interpreted by the operation.
d. At S342, store the links in the right order inside the report with the relevant meta-information as specified by show-tag and show-location attributes.

The method illustrated in FIGS. 6 and 7 may be implemented in a computer program product that may be executed on a computer. The computer program product may be a tangible computer-readable recording medium on which a control program is recorded, such as a disk or hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. Alternatively a transmittable carrier wave may be provided in which the control program is embodied as a data signal, e.g., transmission media, such as acoustic or light waves, such as those generated during radio wave and infrared data communications, and the like. The links specification may also be embodied in one or more of such tangible media.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 6 and 7 can be used to implement the method for processing links.

Most of the features described in the exemplary embodiment can be implemented through an XML syntax from which the examples above are extracted, which comes with a RelaxNG schema. The operational modules 114, 116, 118 (FIG. 5) can be easily implemented by any programmer skilled in the art, either as a so called interpretation module (interpreter) which interpret directly the specification 30, or as some executable code obtained from a so called compilation process.

Without intending to limit the scope of the exemplary embodiment, the following Example demonstrates an implementation of the method.

EXAMPLE

Using the compilation approach, an XSLT 2.0 stylesheet (interpreter/compiler front-end) analyzes the specifications and generates another XSLT 2.0 stylesheet (target code) for implementing each operation (link validation, link transformation, and link (dependency) extraction). An advantage of this approach is the efficiency: the link description section 402 is only interpreted during the compilation phase in order to produce the adequate code. In this implementation, a dedicated, home-made XSLT 2.0 library defines common operations (such as pattern matching functions), and is reused by all stylesheets including the front-end analyzer. The resulting compiled stylesheet can be stored for later use, or directly executed, e.g. through some on-the-fly invocation mechanism such as offered by the Open Source Saxonica Engine (www.saxonica.com).

Experimental results demonstrate that the approach is realistic, useful and leads to realistic performance levels.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for processing links in a markup language document, comprising:
   providing a specification in computer memory, the specification comprising:
      at least one link description rule; and
      at least one link processing rule for processing links which satisfy the link description rule, the at least one processing rule including at least one link transformation rule comprising an initial link state expressed in a matching language, and a final link state expressed in a matching language;
   inputting a markup language document to computer memory;
   processing links in the markup language document in accordance with the at least one link description rule and the at least one link processing rule of the specification to generate processed data, the processed data comprising at least one of a modified markup language document and data derived from the markup language document; and
   outputting the processed data.

2. The method of claim 1, wherein the outputting of the processed data includes outputting the processed data to at least one of:
   a visual display; and
   a file system.

3. The method of claim 1, wherein the at least one link description rule comprises:
   a valid link typology which defines the type of link; and
   a valid link localization which defines the relative location of the link within the markup language document.

4. The method according to claim 1, wherein the processing of the links in the markup language document further comprises:
   parsing the markup language document.

5. The method of claim 1, wherein the at least one link processing rule further includes at least one of:
   a) at least one link validation rule, each link validation rule including expected properties of the link; and
   b) at least one dependency extraction rule, each dependency extraction rule including a search pattern expressed in the matching language.

6. The method according to claim 1, wherein the processing of the links in the markup language document in accordance with the at least one dependency extraction rule comprises:

for each link description rule:
extracting all links from the markup language document satisfying the dependency extraction rule, optionally normalizing each link extracted, and storing the optionally normalized extracted link values, and any related meta-information in computer memory.

7. A computer program product comprising a non-transitory computer-readable recording medium on which a control program is recorded which, when executed by a computer, performs the method of claim 1.

8. A storage medium containing, in a computer readable form, a specification, the specification comprising:
a link description section, comprising at least one link description;
a link transformation description section, comprising at least one link transformation rule description comprising an initial link state expressed in a matching language and a final link state expressed in a matching language;
and, optionally, one of the following:
a link validation description section, comprising at least one link validation description; and
a dependency extraction description section, comprising at least one dependency extraction description.

9. A computer-implemented method for processing links in a markup language document, comprising:
providing a specification in computer memory, the specification comprising:
at least one link description rule; and
at least one link processing rule for processing links which satisfy the link description rule, the at least one link processing rule being selected from the group consisting of:
a) at least one link transformation rule, each link transformation rule including:
an initial link state expressed in a matching language, and
a final link state expressed in the matching language;
b) at least one link validation rule, each link validation rule including expected properties of the link; and
c) at least one dependency extraction rule, each dependency extraction rule including a search pattern expressed in the matching language;
inputting a markup language document to computer memory;
processing links in the markup language document in accordance with the at least one link description rule and the at least one link processing rule of the specification to generate processed data, the processed data comprising at least one of a modified markup language document and data derived from the markup language document, wherein the processing of the links in the markup language document in accordance with the at least one link transformation rule comprises:
for each link transformation rule:
extracting all links in the markup language document described by the link transformation rule;
optionally, normalizing each link extracted;
rewriting each optionally normalized link according to the link transformation rule;
optionally, normalizing the rewritten link;
optionally, handling any forbidden characters within the link, in accordance with its type; and
inserting the optionally normalized and optionally handled rewritten link into an output document in place of the original link extracted; and
outputting the processed data.

10. A computer-implemented method for processing links in a markup language document, comprising:
providing a specification in computer memory, the specification comprising:
at least one link description rule; and
at least one link processing rule for processing links which satisfy the link description rule, the at least one link processing rule being selected from the group consisting of:
a) at least one link transformation rule, each link transformation rule including:
an initial link state expressed in a matching language, and
a final link state expressed in the matching language;
b) at least one link validation rule, each link validation rule including expected properties of the link; and
c) at least one dependency extraction rule, each dependency extraction rule including a search pattern expressed in the matching language;
inputting a markup language document to computer memory;
processing links in the markup language document in accordance with the at least one link description rule and the at least one link processing rule of the specification to generate processed data, the processed data comprising at least one of a modified markup language document and data derived from the markup language document, wherein the processing of the links in the target document instance in accordance with the at least one link validation rule comprises:
for each link validation rule:
extracting all links from the markup language document described by the link validation rule;
optionally, performing a partial normalization on each link extracted;
determining whether each optionally normalized link meets the requirements described in the link validation rule; and
storing the determined data into computer memory; and
outputting the processed data.

11. The method according to claim 1, wherein the processing of the links in the markup language document additionally includes:
extracting any base-uri attributes from the markup language document.

12. The method according to claim 1, wherein the processing links in the markup language document comprises parsing the markup language document to identify links.

13. The method according to claim 1, wherein the markup language is an XML markup language.

14. The method according to claim 1, wherein the output document is a copy of the markup language document in which at least one link is modified.

15. The method according to claim 1, wherein the valid link typology is based on a standard selected from at least one of:
Uniform Resource Locator (URL),
Uniform Resource Identifier (URI),
Internationalized Resource Identifier (IRI),
Uniform Resource Name (URN), and
Extensible Resource Identifier (XRI).

16. A computer-based system for processing links in a markup language document, comprising:
memory which stores:
an optional specification parser;
an optional markup language document parser;
a link validation module;

a link transformation module; and
a dependency extraction module;
wherein the link validation module, link transformation module, and dependency extraction module are configured to perform a process on a markup language document in accordance with the rules provided by an associated specification and wherein at least one of:
a) the link validation module is configured to perform at least the following:
  optionally, extract any base-uri attributes from the markup language document;
  for each link validation rule provided by a specification, perform at least the following:
    extract all links from the markup language document described by the link validation rule;
    optionally, perform a partial normalization on each link extracted;
    determine whether each optionally normalized link meets the requirements described in the link validation rule; and
    store each determination to computer memory; and
b) the link transformation module is configured to perform at least the following:
  optionally, copy a markup language document to an output document;
  for each link transformation rule provided by a specification, perform at least the following steps:
    extract all links from the markup language document described by the link transformation rule;
    optionally, normalize each link extracted;
    rewrite each optionally normalized link according to the information in the link transformation rule;
    optionally, normalize the rewritten link;
    optionally, handle forbidden characters within the link, as required by its type; and
    insert the rewritten link into the output document in replacement of the original link extracted; and
a processor in communication with the memory configured for implementing the link validation module; link transformation module; and dependency extraction module.

17. A computer-based system for processing links in a markup language document, comprising:
memory which stores:
  an optional specification parser;
  an optional markup language document parser;
  a link validation module;
  a link transformation module configured to, for each link transformation rule provided by a specification, perform at least the following steps:
    extract all links from the markup language document described by the link transformation rule;
    rewrite each link according to the information in the link transformation rule; and
    insert the rewritten link into the output document in replacement of the original link extracted; and
  a dependency extraction module;
wherein the link validation module, link transformation module, and dependency extraction module are configured to perform a process on a markup language document in accordance with the rules provided by an associated specification; and
a processor in communication with the memory configured for implementing the link validation module; link transformation module; and dependency extraction module.

18. A computer program product comprising a non-transitory computer-readable recording medium on which a control program is recorded which, when executed by a computer, performs the method of claim 10.

19. In combination, the system of claim 17 and the specification.

20. The system according to claim 17, wherein all of the following are stored in computer memory:
a link validation module;
a link transformation module; and
a dependency extraction module.

21. A computer program product comprising a non-transitory computer-readable recording medium on which a control program is recorded which, when executed by a computer, performs the method of claim 9.

22. A links processing system comprising memory which stores instructions for performing the method of claim 1 and a processor in communication with the memory for executing the instructions.

23. The system according to claim 17, wherein the dependency extraction module is configured to perform at least the following:
for each link description rule provided by the specification, perform at least the following:
extract all links from the markup language document satisfying the dependency extraction rule;
optionally, normalize each link extracted; and
store the optionally normalized extracted link values, along with the related meta-information, to computer memory.

* * * * *